United States Patent [19]

Roberge

[11] 4,411,545
[45] Oct. 25, 1983

[54] SWIVEL JOINT

[75] Inventor: Gérard Roberge, Valence, France

[73] Assignee: SKF Compagnie d'Applications Mecaniques - ADR, Saint Vallier sur Rhone, France

[21] Appl. No.: 353,897

[22] Filed: Mar. 2, 1982

[30] Foreign Application Priority Data

Mar. 6, 1981 [FR] France ................................ 81 04797

[51] Int. Cl.$^3$ ...................... B65D 59/00; F16G 11/00; F16L 35/00
[52] U.S. Cl. ...................................... 403/12; 403/122; 384/208
[58] Field of Search ....................... 403/12, 56, 76, 77, 403/90, 122, 164; 464/106; 384/208, 209, 210

[56] References Cited

U.S. PATENT DOCUMENTS

| | | | |
|---|---|---|---|
| 2,047,885 | 7/1936 | Riebe | 384/210 |
| 3,007,747 | 11/1961 | Isler | 384/208 |
| 3,174,811 | 3/1965 | Schmidt et al. | 384/208 |
| 3,365,249 | 1/1968 | McCloskey | 384/209 |
| 3,586,358 | 6/1971 | Kiesow | 403/122 |
| 3,589,779 | 6/1971 | Sokol | 384/208 |
| 3,803,685 | 4/1974 | Muhn | 403/76 X |

FOREIGN PATENT DOCUMENTS 554879   3/1943   United Kingdom ................ 384/208

Primary Examiner—Wayne L. Shedd
Attorney, Agent, or Firm—Young & Thompson

[57] ABSTRACT

A swivel joint comprises an outer ring having a cavity in the form of a portion of sphere, and an inner ring whose shape is partly spherical and which is housed in the spherical cavity of the outer ring. The inner ring presents only two diametrically opposite notches, disposed substantially in the median plane perpendicular to the axis of the ring. The outer ring presents only two pairs of notches whose width is equal, to within the clearance, to the width of the parts of the ring which flank the notches of the inner ring, the two notches of the same pair of outer ring notches being spaced apart from each other by a distance equal, to within the clearance, to the width of the notches of the inner ring, the assembly of two notches of a pair of outer ring notches extending over a width substantially equal to the thickness of the inner ring.

3 Claims, 6 Drawing Figures

SWIVEL JOINT

FIELD OF THE INVENTION

The present invention relates to a swivel joint.

BACKGROUND OF THE INVENTION

A swivel joint comprises an outer ring having a cavity in the form of a portion of sphere, and an inner ring whose form is partly spherical and which is housed in the spherical cavity of the outer ring.

Various solutions have been proposed for assembling the inner ring in the cavity of the outer ring. In certain swivel joints, the outer ring is split, this enabling it to be opened elastically and making it possible to introduce the inner ring therein. In other swivel joints, the outer ring is pressed on the inner ring. It is also possible to constitute the swivel joint with the aid of several pieces added together, assembled by a band or by wilding.

Swivel joints are also known in which the cavity of the outer ring presents two diametrically opposite notches in part of its thickness, the diameter of these notches being equal to the diameter of the inner ring and their width being equal to that of this ring. It is possible to place the inner ring in position by orienting it through 90° with respect to its normal position; it then suffices to pivot the inner ring to return it to its correct orientation.

However, these swivel joints present drawbacks which limit their domains of application; in particular, they can hardly be used when the swivel joint is subjected to a high radial load or to an axial load. In the case of a swivel joint with conventional notches, for example, these notches considerably reduce the surface of contact of the two rings and the resulting concentration of the efforts on the remaining surface brings about rapid deterioration of the swivel joint.

U.S. Pat. No. 3,007,747 relates to a swivel joint whose inner ring comprises a series of relatively narrow notches defining radial annular ribs, whilst its outer ring presents a series of notches allowing passage of the annular ribs of the inner ring. However, this swivel joint is even less resistant to an axial load, particularly due to the thinness of the ribs which may bend under the effect of this load.

SUMMARY OF THE INVENTION

It is an object of the present invention to provide an improved swivel joint which can withstand considerable axial and/or radial loads.

This swivel joint is of the type in which the cavity of the outer ring presents diametrically opposite notches in a part of its thickness, and is characterised in that the inner ring presents only two diametrically opposite notches disposed substantially in the median plane perpendicular to the axis of the ring and in that the outer ring presents only two pairs of notches whose width is equal, to within the clearance, to the width of the parts of the inner ring which flank the notches, the two notches of the same pair being spaced from each other by a distance equal, to within the clearance, to the width of the notches of the inner ring.

PARTICULAR DESCRIPTION OF THE DRAWINGS

Figure 1:
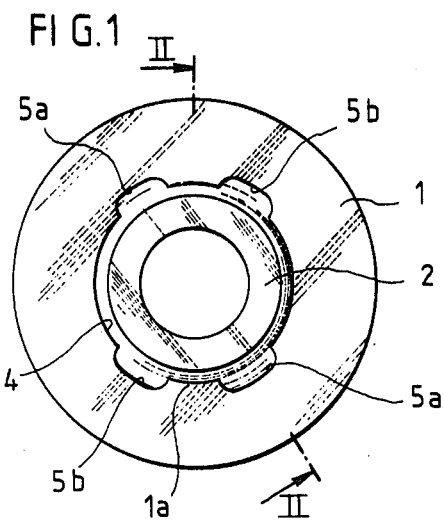
FIG. 1 is a view in elevation of the swivel joint.

Referring now to the drawings, the swivel joint according to the invention comprises an outer ring 1 and an inner ring 2.

Figure 6:
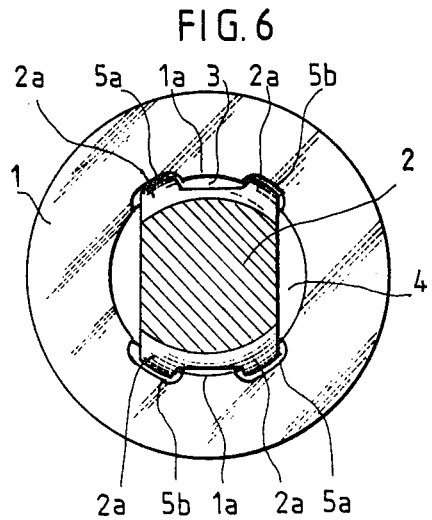
FIG. 6 is a section along VI—VI of FIG. 5.

The inner ring 2 is externally in the form of a truncated sphere and comprises two notches 3 which are diametrically opposite and disposed substantially in the median plane perpendicular to the ring; their width, as may be seen in particular in FIG. 6, is at least equal to 40% of the thickness of the outer ring 1 and at the most equal to 80% of the thickness of the inner ring. The outer ring 1 presents a cavity 4 in the form of a portion of sphere, the radius thereof being equal, to within the clearance, to that of the ring 2; it comprises two pairs of notches 5a and 5b which are diametrically opposite and which extend in substantially half the thickness of the ring. The bottom of each of these notches is cylindrical, with a radius slightly greater than that of the inner ring 2. These notches have a width slightly greater than those of parts 2a of the ring 2 which flank the notches 3 and each notch 2a is spaced from the adjacent notch 2b by a distance slightly greater than the width of these notches.

Figure 2:
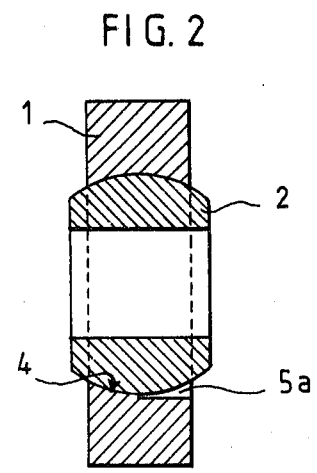
FIG. 2 is a section thereof along II—II of FIG. 1.
Figure 3:
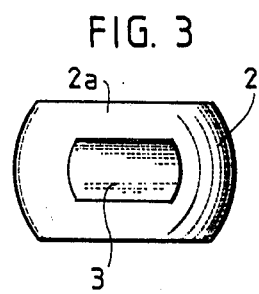
FIG. 3 is a plan view of the inner ring.
Figure 4:
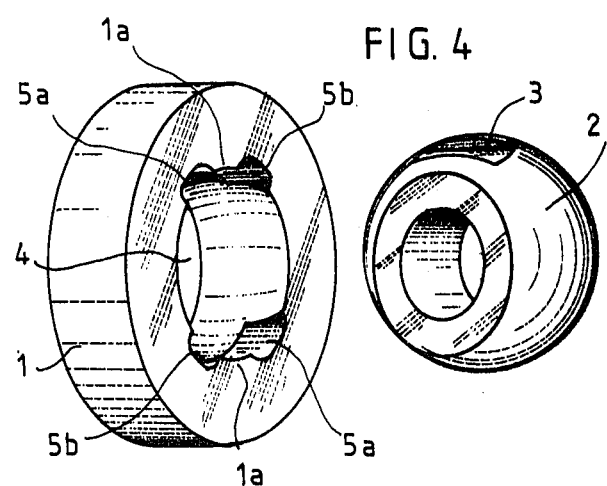
FIG. 4 is a view in perspective showing the positioning of the inner ring of the swivel joint in the outer ring thereof.
Figure 5:
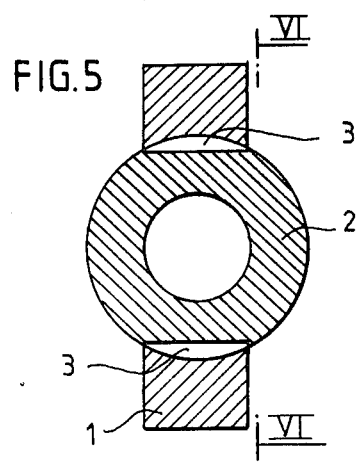
FIG. 5 is a view in axial section through the swivel joint, during such positioning.

To position the inner ring 2 in the ring 1, the ring 2 is pivoted through 90° from its normal position, as shown in FIG. 4, and is fitted in the face of the ring 1 in which the notches 5a and 5b are located. During this manoeuvre, the parts 1a of the ring 1 located between the notches 5a and 5b engage in the notches 3 at the same time as the parts 2a of the ring 2 engage in the notches 5a and 5b (cf. FIG. 6). At the end of movement, the axis of the ring 2 is in the plane of the ring 1, as shown in FIG. 5. It then suffices to pivot the inner ring 2 to return it to its normal position (FIG. 2); this ring can now no longer escape from the outer ring.

When the swivel joint is subjected to a load which, in FIG. 1, is vertical and directed downwardly, this load is supported without difficulty by part 1a of the outer ring 1. If the direction of the load is oblique and passes through a notch 5a or 5b, this load is also very well supported by the joint due to the small width of the notch. The joint may generally withstand greater radial and/or axial loads than conventional swivel joints do.

It is obvious that the invention must not be considered as being limited to the embodiment described and shown, but covers, on the contrary, all the variants thereof.

What is claimed is:

1. In a swivel joint comprising an outer ring having a cavity in the form of a portion of sphere, and an inner ring whose shape is partly spherical and which is housed in the spherical cavity of the outer ring, the cavity of the outer ring presenting, in part of its thickness, diametrically opposite notches,
    the inner ring presents only two diametrically opposite notches, disposed substantially in the median plane perpendicular to the axis of the ring, and
    the outer ring presents only two pairs of notches whose width is substantially equal, to the width of the parts of the ring which flank the notches of the inner ring, the two notches of the same pair of outer ring notches being spaced apart from each other by a distance substantially equal, to the width of the notches of the inner ring, the assembly of two notches of a pair of outer ring notches extending over a width substantially equal to the thickness of the inner ring.

2. The swivel joint of claim 1, wherein the width of the notches of the inner ring is at least equal to 40% of the thickness of the outer ring.

3. The swivel joint of claim 1, wherein the width of the notches of the inner ring is at the most equal to 80% of the thickness of said inner ring.

* * * * *